May 13, 1958 L. BENDER 2,834,837

DUST COVER OF SILENCING MATERIAL FOR TELEPHONE DIAL MECHANISM

Filed Dec. 8, 1954

INVENTOR.
Lloyd Bender,
BY
Brown, Jackson, Boettcher & Dienner
Attys.

United States Patent Office 2,834,837

Patented May 13, 1958

2,834,837

DUST COVER OF SILENCING MATERIAL FOR TELEPHONE DIAL MECHANISM

Lloyd Bender, Galion, Ohio, assignor to North Electric Company, a corporation of Ohio Application December 8, 1954, Serial No. 473,837

3 Claims. (Cl. 179—90)

Figure 1:
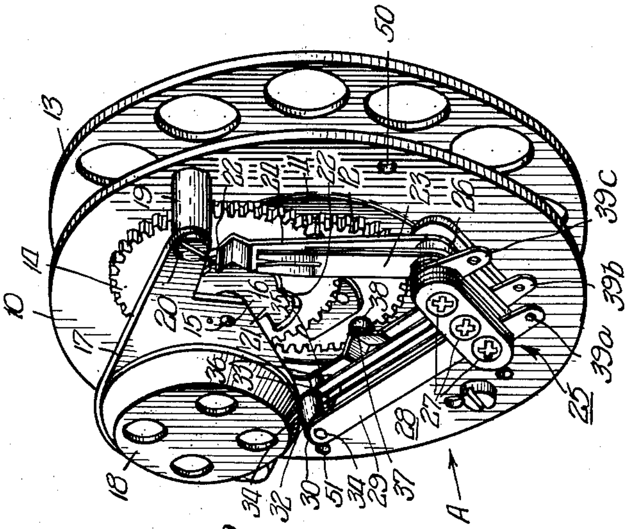

The present application relates to a telephone dial mechnism, and more particularly to a dust cover of silencing material for suppressing undesirable sounds emanating from telephone dial mechanisms.

Conventional telephone instruments, utilizing dial mechanisms, often have an undesirable amount of noise emanating from the base of the instrument during the dialing operation. This noise is generally caused by the gear chatter and governor vibration which occur during the dialing operation. The physical contact of the shunting and impulsing springs contribute to the noise level, although to a much lesser extent than do the gear and governor mechanisms. Certain dials of current manufacture have shown great improvement in the reduction of gear noise over those of other prior art structures, but even these have not achieved the ideal.

In addition to the disturbing noise originating in the telephone instrument, the desired secrecy of communication is impaired since a trained observer is able to determine the called number by counting the series of clicks caused by the closing of the dialing contacts. Various solutions to the problem of minimizing or inhibiting the loudness and clarity of the clicks associated with dialing have been proposed. In particular, gear train arrangements have been devised which operate in such a manner as to minimize the distinctness of the clicks which occur during the dialing operation. Efforts along this line however have not been completely rewarded with a suitable solution to the problem, although recent dial mechanisms generate considerably less distinct clicks than hithertofore.

In order to protect the delicate dialing mechanism from dust particles which would cause interruption of reliable service, a dust cover has been provided which encloses the dial mechanism and provides a dust-proof shield. However, prior art dust shields have proven ineffective in reducing the objectionable noise emanating from the dial mechanism and have, in general, tended to amplify the noise since they act as sounding boards.

Moreover, any use of the more conventional type of acoustic muting materials to solve this problem would introduce additional problems. It would be dangerous for example to use acoustical or sound absorbing material which generally comprises fibrous matting, such as felt or other filamentous material, near the delicate dialing mechanism of the telephone instrument, for the accumulation of even small amounts of fibrous materials between the contacts of the dial mechanism tends to interfere with the normal use of the dial equipment. In fact the problem of eliminating the undesired noise has been accentuated by the failure of the usual sound absorbing media to provide a successful solution.

It is an object of the present invention to provide a novel sound absorbing cover for telephone dial equipment which overcomes one or more of the disadvantages of prior art structures.

It is an additional object of the present invention to provide a sound attenuating enclosure for dial mechanisms which not only effectively inhibits the amplification of noise associated with dialing, but also effectively acts as a dust shield to protect the operating contacts of the dial mechanism.

It is an additional object of the present invention to provide a housing for the dial mechanism which while inhibiting the amplification of noise produced in the dial mechanism, also does not introduce into the delicate dial equipment deleterious substances which would interfere with its proper operation.

Figure 2:
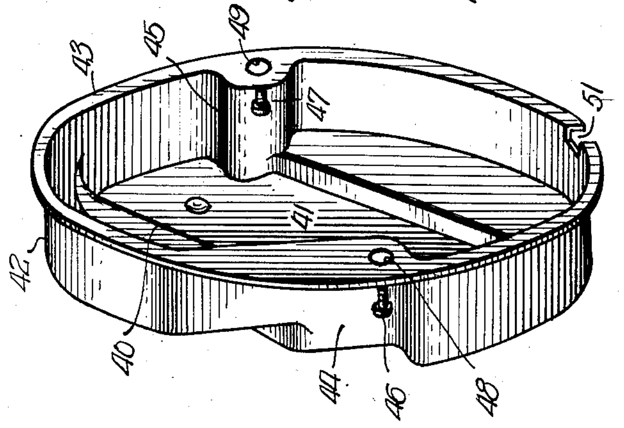

These and other features of the invention will become apparent with reference to the following specification and claims when considered in relation to the accompanying drawings in which Figure 1 is a perspective view of the dial mechanism; and Figure 2 is a perspective view of a dust cover embodying the features of the present invention.

In accordance with the present invention a telephone dialing mechanism comprises a base member, electrical impulse generating means mounted on the base member, and a housing of material having effective sound attenuation characteristics relative to the noise produced by the impulsing means. The housing has depending sides abutting the base member for effecting a substantially dust-proof shield for the impulse generating means and for reducing the intensity of noise produced by these means.

Figure 1 illustrates the telephone dialing mechanism with the exception of the resilient housing, and is shown for the purpose of presenting an environment in which the features of the present invention are most readily apparent. In this figure the base member 10, comprising a thin plate of brass or other suitable material, serves as the mounting base for the remainder of the dial equipment. Base member 10 is shown as being of generally circular shape, although any other suitable shape may be used. A generally circular depression 11 is disposed concentrically at the center of base member 10 and partially encompasses a metallic toothed gear wheel 12. Gear 12 is rotatably connected by a pin (not shown) to a finger wheel 13 disposed at the opposite side of base member 10 and having ten spaced apart openings which are adapted to receive the finger of the user, and which respectively corresponds to the digits 1–0, inclusive. A second toothed gear 14 of fiber is coupled to gear 12 by a small pinion gear (not shown) situated beneath gear 14 and centrally attached to a shaft 15 which extends through gear 14. One end of pin 15 is rotatably maintained in a small aperture 16 in a base member 17 which supports a governor mechanism shown generally at 18. Governor mechanism 18 contains a control mechanism to insure a constant angular velocity of finger wheel 13 and its associated gear train during a portion of their operation. The opposite end of pin 15 (not shown) is rotatably held by base member 10. Support member 17 is maintained a predetermined distance above base member 10 by a pillar 19 attached at its lower extremity to base member 10 and into which screw 20 is threaded and by a corresponding pillar and screw assembly (not shown) at its opposite side.

A contact actuating disc 21, centrally mounted for rotation about shaft 15, lies in a plane parallel to and above that of gear 14. Disc 21 has three fingers or projections 22 (only two of which are shown) spaced 120 degrees apart around its periphery. An impulse generating means comprises an upper contact carrying lever 23 extending to a point adjacent the path of movement of projections 22 and which at one extremity has a bifurcated end portion having small projections of gold or other suitable electrical conducting material disposed on its under surface. Disposed immediately below and parallel to contact carrying lever 23 is another contact carrying arm 24 which at one extremity has a V-shaped portion extending downwardly toward fingers 22 of actuating disc 21. The upper surface of arm 24 has a pair of conducting projections corresponding to those at the extremity of lever 23 to provide a closed electrical circuit upon contact thereof. The V-shaped extension of arm 24 physically contacts fingers 22 of disc 21 during a portion of their travel and moves up and down as these fingers are rotated below it. The portions of lever 23 and arm 24 opposite the contact carrying ends are bent at an obtuse angle with respect to the contact carrying portions and are maintained fixedly in an assembly 25 comprised of alternative layers of insulating material 26 and the extensions of the contact carrying levers. These alternative layers are maintained in a fixed position by bolts 27 which extend through the assembly and are threaded into base member 10.

A second contact carrying assembly shown generally at 28 comprises an upper pair of contact carrying levers 29 and 30 of electrically conductive material which bear electrical contacts on opposing faces. Contact carrying arm 29 is parallel to and extends beyond the end of contact lever 30. The lower pair of contact carrying arms 32 and 33 is disposed below and in spaced parallel relationship to each other and to the upper contact carrying arms 29 and 30. Each of these upper and lower pairs of contact carrying arms has on opposed faces small deposits of electrically conductive material (not shown) to insure positive electrical contact upon closure. As in the case of upper contacting lever 29, the lowermost contact carrying lever 33 extends beyond its associated contact carrying arm 32. The extending portions of upper and lower contact carrying arms 29 and 33 are separated by a spacing member 34 attached to each of these arms which may be composed of rubber or other suitable insulating material. The contacts of the upper pair 29 and 30 of contact carrying levers are maintained in a normally open position while the contacts of the lower pair 32 and 33 of contacting arms are normally in a closed position. The ends of contact carrying members 32 and 33 opposite the contact carrying ends are maintained in mutually insulated relationship in mounting assembly 25.

A contact actuator assembly arm 35 is disposed below and parallel to the lowermost contact carrying member 33 and at its outermost extremity rests a block of insulating material 36 which is in physical contact with the upper surface of actuator means 35 and the lower surface of contact carrying arm 33. Block 36 is attached to actuator assembly arm 35 by a suitable bolt or rivet. Disposed approximately midway along the length of actuator member 35 is a U-shaped projection 37 which is struck downwardly from the otherwise straight member 35. The under surface of projection 37 is disposed so as to ride upon a small projection 38 which is affixed to gear 12 near its periphery.

Lugs 37, 38 and 39 are electrically connected to appropriate contact carrying levers of each contact assembly and are positioned to receive electrical conducting leads (not shown) which extend to other parts of the telephone instrument.

The operation of the dial mechanism will now be briefly described. In this discussion, the direction of rotation of the various gears is described as viewed from a point A situated at the rear of the dial mechanism. Upon the initiation of dialing by the counterclockwise rotation of finger wheel 13, gear 12 which is coupled thereto rotates in the same direction to move projection 38 away from its position beneath depression 37 of actuator means 35. Upon movement of projection 38, arm 35 which is biased to move downwardly drops toward the surface of gear 12. This action lowers the position of the upper and lower contact carrying levers 29 and 33 so that the normally open contacts between arms 29 and 30 are now closed, and the normally closed contacts carried by arms 32 and 33 are now opened. The opening and closing of these contacts remove the receiver from the circuit during the dialing operation to prevent dialing pulses from being repeated in the receiver.

When the finger wheel 13 is rotated by an appropriate amount corresponding to a desired digit, it is then released by the user. A spring biasing mechanism contained in a cup under the finger wheel causes wheel 13 to be rotated in a clockwise direction until it meets a stop (not shown). Disc 21 is engaged by a pawl and ratchet assembly (not shown) coupled to gear 14 and rotates in a counterclockwise direction as gear 14 revolves in response to the movement of gear 12. Finger extensions 22 of disc 21 are carried in a counterclockwise direction and separately slide under the V-shaped portion of arm 24 to lift it so that the contacts on arms 23 and 24 close when a given finger of disc 21 passes below the V-shaped extension. Arm 24 is raised from its normal rest position by each of fingers 22 and its resilience biases it to return it to that position. As each of these finger extensions 22 rides past the downwardly biased V-shaped extension of arm 24, it returns to its unbiased condition to open the contacts of arms 23 and 24. A predetermined time later a second finger of disc 21 passes below the V-shaped extension to again operate the contacts on arms 23 and 24.

The ratio of the gear train between disc 21 and the finger wheel 13 is so proportioned that for each digit to be registered a series of electrical impulses corresponding in number to that digit is generated by the opening and closing of the contacts of arms 23 and 24. This information is translated through the appropriate leads extending from the dial mechanism to the equipment in the central office to actuate relays and complete the dialing in a well known manner. The above sequences of operation are repeated for each digit of the called number.

As previously discussed, during the operation of the dialing mechanism, objectionable sounds emanate from this mechanism. In particular, the noise generated in governor 18 and to a lesser extent the clicks associated with the opening and closing of the contacts between arms 23 and 24 are particularly objectionable. In addition, to a trained observer the clicks which occur during the making and breaking of the impulsing contacts of certain prior art structures are distinctly audible and may be recorded so that the subscriber who is dialing no longer enjoys the secrecy to which he is entitled. Particularly, in military applications where utmost secrecy is of paramount importance, a dial mechanism which indicates the number dialed is particularly objectionable. As a solution to these difficulties, Figure 2 shows a dust cover of resilient, sound attenuating material which inhibits the amplification not only of the general noise produced by the dial mechanism but also the distinctness of the clicks associated with the dialing of particular digits so as to increase the secrecy of communication.

In particular the dust cover of Figure 2 has an upper closing surface 40 which extends over an area generally shaped to correspond to the outer periphery of base member 10. A substantially rectangular, raised portion 41 extends above the central portion surface 40 and forms a housing to partially enclose those portions of the dial mechanism which are disposed farthest from the surface of base member 10, such as governor mechanism 18 and contact mounting assembly 25. A depending side 42 generally of cylindrical form connects upper portion 40 with a flange 43 which extends outwardly and perpendicularly to side 42 around its periphery. Flange 43 lies in a plane parallel to that of surface 40 and abuts the upper surface of member 10 when the dust cover is attached to it.

To preserve the dust shielding character of the cover while yet providing a convenient means for affixing the cover to member 10, inwardly struck depressions 44 and 45 are disposed at diametrically opposed points on depending side 42. There is, therefore, no discontinuity in side 42 although it is deformed from its cylindrical shape at these points of depression. Flange 43 is enlarged at the lower ends of depressions 44 and 45 to provide a surface against which the under surfaces of heads of bolts 46 and 47 may abut. Apertures 48 and 49 are provided in the enlarged portion of flange 43 through which the threaded shafts of bolts 46 and 47 pass. Apertures 50 and 51 are tapped in member 10 in corresponding relation to apertures 48 and 49 of flange 43 to receive the threaded shafts of bolts 46 and 47 for securing the dust cover against the outer, upper surface of member 10. A small cut out portion 51 of the dust shield is provided to permit the electrical conducting leads access from the dialing mechanism to the other portions of the telephone instrument.

The material of which the dust cover is composed should be impervious to moisture and dust as well as flexible so as to prevent amplification of the noise emanating from the gear train mechanism and from the various contacts within the dial mechanism. A material having these desired characteristics may be found in the group of plastics of the elastolene class. In particular, such a plastic is commerically available as polyethylene. This material while it is extremely flexible or resilient is particularly resistant to corrosive alkalies and acids. It is extremely water and dust resistant and may be quite easily molded into the proper or desired shape under appropriate conditions of temperature and pressure. Under the usual operating conditions of this environment, polyethylene exhibits good recovery from deformation with only a very slight cold flow.

One proposed explanation for the successful inhibition of the tendency of the dust shield to act as a sounding board or amplifier achieved by the use of polyethylene is that the sound impinging upon the inner surface of the polyethylene dust shield is absorbed by the molecular friction within the material as it vibrates in response to the sound. From this viewpoint there is a definite connection between the resiliency of the polyethylene and its non-amplifying qualities. Furthermore, it is believed that there is an impedance mismatch between the surface of the polyethylene and the air inside the dust cover with which it is in contact, thus contributing to the attenuation of the sound impinging upon this surface.

Another outstanding feature of the use of polyethylene is its provision of a sound absorbing medium without the usual fibrous substances which hitherto have been used as sound absorbing material. As a result there is no danger of having small particles which might be shaken loose from the sound absorbing material interfering with the operation of the delicate dial mechanism.

In an extended field trial conducted to determine the relative value of the dust cover of the present invention with respect to prior art dust covers, it was discovered that a dust cover composed of polyethylene was far superior in that the noise emanating from the subset housing was much less when polyethylene was used than when the conventional materials, such as polystyrene, were used. In fact there was even noted a noise reduction using a polyethylene dust cover in comparison with a subset having no dust cover. Consequently, the polyethylene dust cover not only did not amplify the noise generated by the dial mechanism but even suppressed or attenuated much of it.

Therefore the present invention is directed to a new and novel dust cover of sound absorbing material for a dial mechanism which finds particular use in suppressing undesirable noise and increases the secrecy of the dialing operation.

While there has been described what is regarded to be a preferred embodiment of the invention, it will be apparent that various changes, rearrangements and modifications may be made therein without departing from the scope of the invention as defined by the appended claims.

What is claimed is:

1. A telephone dialing mechanism comprising a base member, electrical impulse generating means mounted on said base member, a housing of a material having the effective sound attenuation characteristics of a polyethylene material relative to the noise produced by said impulsing means, said housing having depending sides abutting said base member for effecting a substantially dustproof shield for said means and for reducing the intensity of noise produced by said impulse generating means.

2. A telephone dialing mechanism comprising a base member, electrical impulse generating means mounted on said base member, a polyethylene housing partially enclosing said means, said housing having depending sides abutting said base member for effecting a substantially dust-proof shield for said means and for reducing the intensity of noise produced by said impulse generating means.

3. A telephone dialing mechanism comprising a base member, electrical impulse generating means mounted on said base member, a housing of substantially resilient material of the polyethylene type partially enclosing said means, said housing having internally facing discontinuous surfaces and depending sides abutting said base member for effecting a substantially dust-proof shield for said means and for reducing the intensity of noise produced by said impulse generating means.

References Cited in the file of this patent

The Stromberg-Carlson Dial (pamphlet), page 5.